(12) United States Patent
Wallace

(10) Patent No.: US 8,142,528 B2
(45) Date of Patent: Mar. 27, 2012

(54) METHODS AND SYSTEMS OF REDUCING VISCOSITY OF GASIFICATION SYSTEM SLAG

(75) Inventor: Paul Steven Wallace, Katy, TX (US)

(73) Assignee: General Electric Company, Schenectady, NY (US)

(*) Notice: Subject to any disclaimer, the term of this patent is extended or adjusted under 35 U.S.C. 154(b) by 1210 days.

(21) Appl. No.: 11/290,650

(22) Filed: Nov. 30, 2005

(65) Prior Publication Data

US 2007/0119099 A1    May 31, 2007

(51) Int. Cl.
| | |
|---|---|
| *B01J 7/00* | (2006.01) |
| *C01B 3/36* | (2006.01) |
| *C01B 6/24* | (2006.01) |
| *C01B 3/02* | (2006.01) |
| *C01B 3/24* | (2006.01) |

(52) U.S. Cl. ........ 48/61; 48/197 R; 423/644; 423/648.1; 423/650

(58) Field of Classification Search .......... 48/61, 197 R; 423/644, 648.1
See application file for complete search history.

(56) References Cited

U.S. PATENT DOCUMENTS

| | | | |
|---|---|---|---|
| 3,920,417 A | | 11/1975 | Fernandes |
| 4,069,024 A | | 1/1978 | Fernandes |
| 4,346,317 A | | 8/1982 | Fernandes |
| 5,320,051 A | * | 6/1994 | Nehls, Jr. ...................... 110/345 |
| H1325 H | * | 7/1994 | Doering et al. ............. 48/197 R |
| 5,647,876 A | * | 7/1997 | Winter et al. ............... 48/197 R |
| 6,773,630 B2 | | 8/2004 | Stellaccio et al. |
| 6,815,386 B1 | | 11/2004 | Kwong et al. |
| 2003/0005634 A1 | * | 1/2003 | Calderon et al. ................ 48/210 |
| 2006/0165582 A1 | | 7/2006 | Brooker et al. |

FOREIGN PATENT DOCUMENTS

WO   WO 03069277 A1 *   8/2003

* cited by examiner

*Primary Examiner* — Matthew Merkling
(74) *Attorney, Agent, or Firm* — Armstrong Tesasdale LLP

(57) ABSTRACT

Methods and systems for gasifier fines recycling system are provided. The system includes a gasifier slag removal system configured to separate first fines from a particulate slag removed from a gasifier by at least one of settling and filtering, a second fines handling system configured to receive second fines from a source other than the gasifier, and an injection system configured to mix the first fines and the second fines and a fuel for injection into the gasifier.

6 Claims, 3 Drawing Sheets

METHODS AND SYSTEMS OF REDUCING VISCOSITY OF GASIFICATION SYSTEM SLAG

BACKGROUND OF THE INVENTION

This invention relates generally to integrated gasification combined-cycle (IGCC) power generation systems, and more specifically to methods and apparatus for reducing the viscosity of gasifier slag.

At least some known IGCC systems include a gasification system that is integrated with at least one power producing turbine system. For example, known gasifiers convert a mixture of fuel, air or oxygen, steam, and/or limestone into an output of partially combusted gas, sometimes referred to as "syngas". The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

Some know gasification fuels, for example, heavy residual oils contain ash, metal, and mineral impurities. When gasified, the ash, metal, and mineral can form a high viscosity sludge that accumulates in the gasifier. The accumulation, over time leads to plugging which requires an undesirable change in gasifier operation such as at increased unconverted carbon or a switch to a more expensive higher quality feed.

BRIEF DESCRIPTION OF THE INVENTION

In one embodiment, a gasifier fines recycling system includes a gasifier slag removal system configured to separate first fines from a particulate slag removed from a gasifier by at least one of settling and filtering, a second fines handling system configured to receive second fines from a source other than the gasifier, and an injection system configured to mix the first fines and the second fines and a fuel for injection into the gasifier.

In another embodiment, a method of combusting a fuel in a gasifier includes providing a fuel to the gasifier, providing first fines recovered from the gasifier wherein combustion of at least one of the fuel, and a combination of the fuel and first fines in the gasifier generates a sludge having a first viscosity, providing second fines recovered from a source other than the gasifier, mixing the first fines, the second fines and the fuel to generate a fuel mixture wherein combustion of the fuel mixture in the gasifier generates a slag having a second viscosity, the second viscosity being less than the first viscosity, and combusting the fuel mixture in the gasifier.

In yet another embodiment, a gasification system includes a pressure vessel comprising a combustion zone, and a fuel injection system configured to inject a mixture of a fuel and fines into the combustion zone such that when the mixture is combusted, the fines facilitate reducing a viscosity of a sludge generated when the fuel is combusted without the fines.

DETAILED DESCRIPTION OF THE INVENTION

Figure 1:
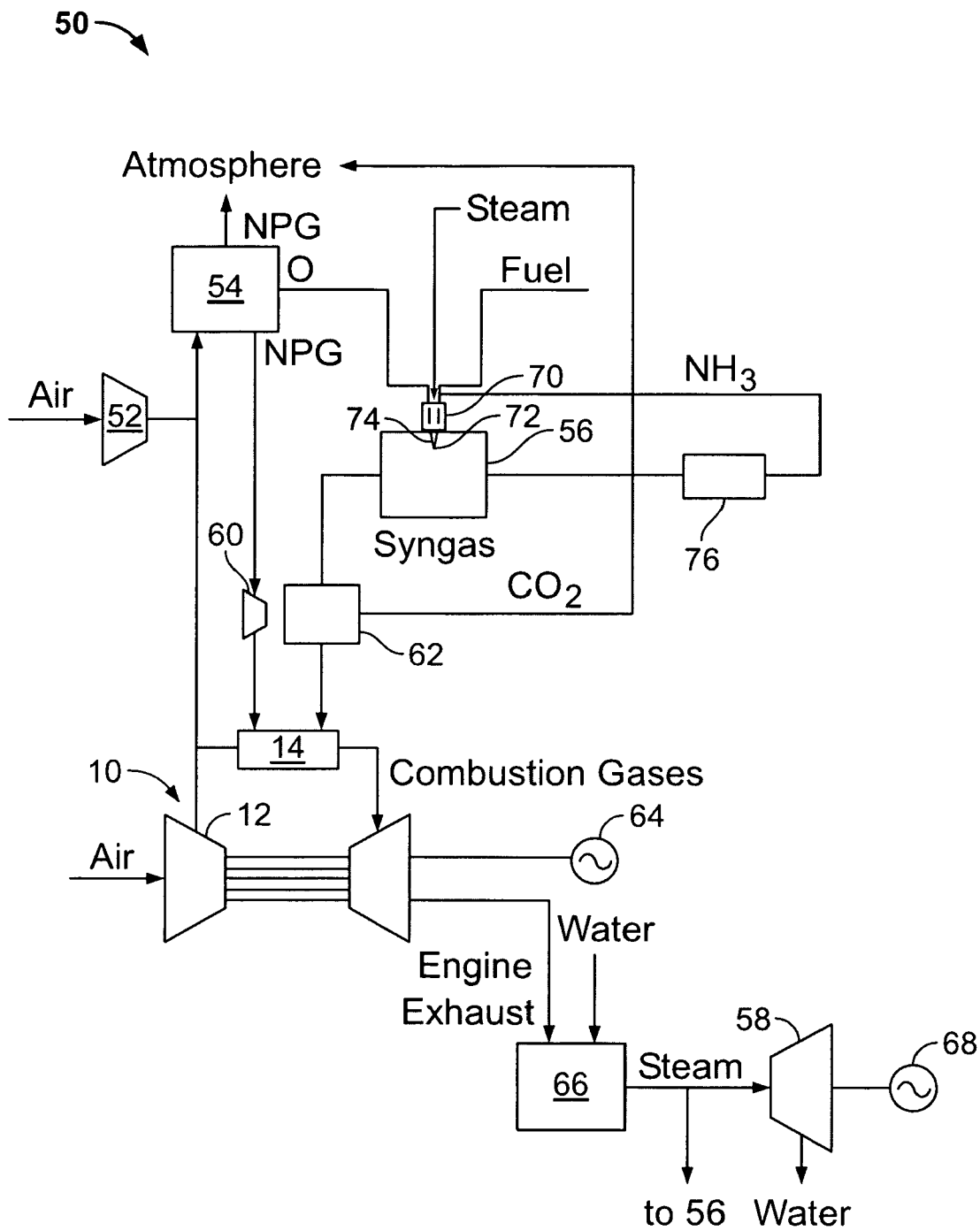
FIG. 1 is a schematic diagram of an exemplary known integrated gasification combined-cycle (IGCC) power generation system.

FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

Figure 2:
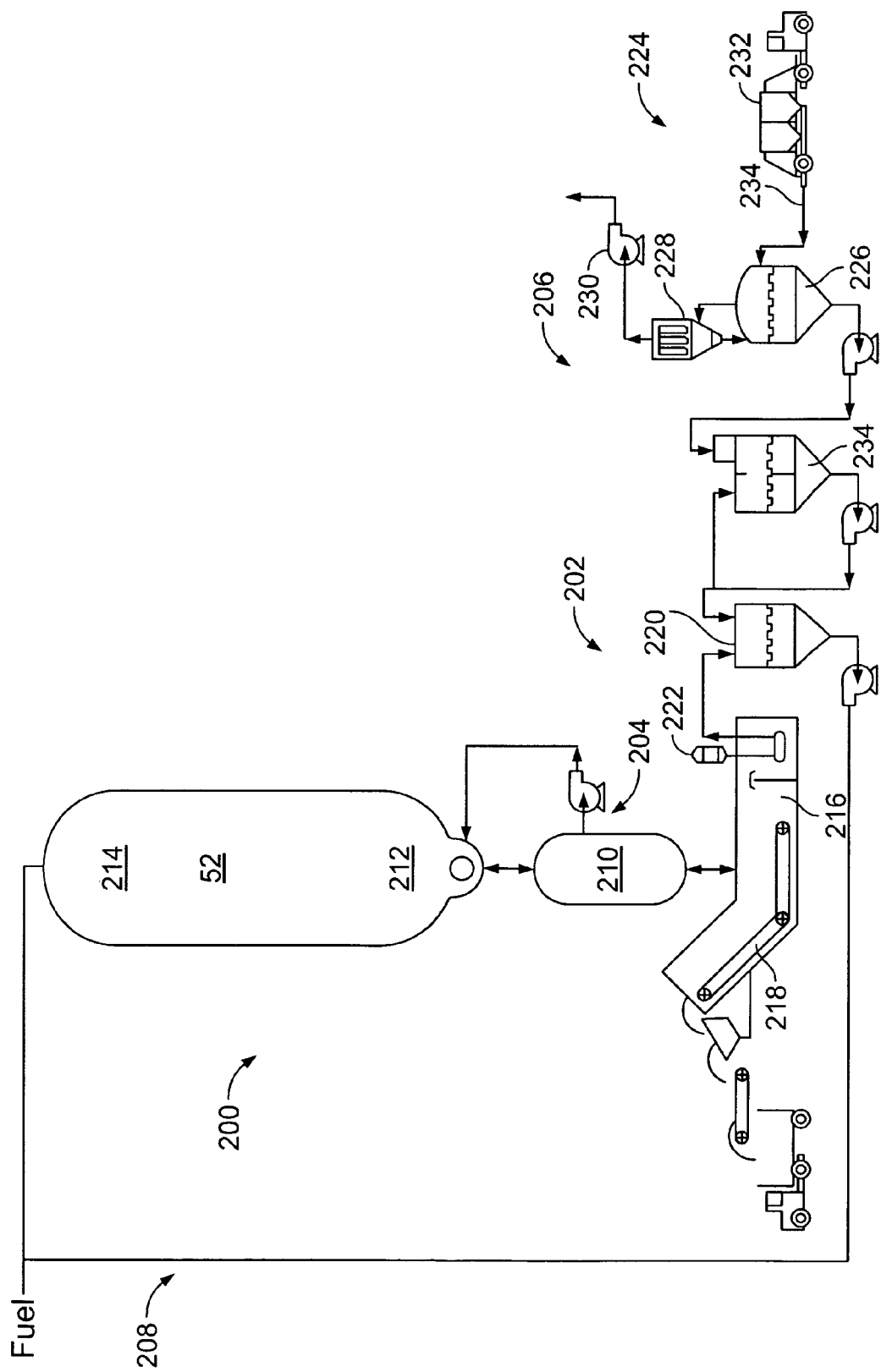
FIG. 2 is a schematic view of a gasification section that may be used with the integrated gasification combined-cycle (IGCC) power generation system shown in FIG. 1.

FIG. 2 is a schematic view of a gasification section 200 that may be used with an integrated gasification combined-cycle (IGCC) power generation system 50 (shown in FIG. 1). IGCC 50 includes gasifier 52 that when burning a fuel comprising heavy residual oils contain ash and other mineral impurities can form a high viscosity sludge that accumulates in gasifier 52. The accumulation, over time often leads to plugging which requires an undesirable change in gasifier operation such as at increased unconverted carbon or a switch to a more expensive higher quality feed. In the exemplary embodiment, a gasifier fines recycling system 202 is coupled in flow communication with gasifier 52. Gasifier fines recycling system 202 includes a gasifier slag removal system 204 configured to separate first fines from a particulate slag removed from a gasifier by at least one of settling and filtering, a second fines handling system 206 configured to receive second fines from a source other than the gasifier, and an injection system 208 configured to mix the first fines and the second fines and a fuel for injection into the gasifier.

In the exemplary embodiment, gasifier slag removal system 204 includes a lockhopper 210 configured to facilitate maintaining a predetermined water level in a bottom shell 212 of gasifier 52 while permitting passage of slag collected from a combustion zone 214 in gasifier 52. The slag is formed in combustion zone 214 due to mineral impurities in a fuel that is combusted in combustion zone 214. Minerals that lead to slag formation may also be introduced into the fuel or separately into combustion zone 214 for combustion zone conditioning and/or to facilitate disposal of fines. Slag recovered in bottom shell 212 is transported trough lockhopper 210 as a granular solid to a trough 216. Fine particulates may accompany the slag and remain suspended in water filled trough 216. Slag is removed from trough 216 using one or more conveyors 218 that screen the slag and transport it to a disposal facility (not shown) where it may be recycled into a useful by product, such as roofing shingle media or blasting grit.

Fines recovered from lockhoppper 210 are pumped to a recycle tank 220 using a conveying pump 222. The fines recovered from lockhoppper 210 are further pumped to injection system 208 for mixing with a fuel to be injected into gasifier 52. The proportion of fuel to fines is controlled to facilitate combustion of the fuel and heating of the fines to form a slag that can be cooled and collected in a granular form for removal from gasifier 52. Some known fuels, such as, but not limited to residual heavy oil, fuel recovered from tar sands, and other fuels include constituents that tend to form a sticky non-flowing sludge when combusted in combustion zone 214. Such constituents may include Vanadium (V) and/ or Nickel (Ni). To mitigate the effects of the constituents that cause the formation of the sticky non-flowing sludge additional fines materials comprising minerals that when combusted in combustion zone 214 form a less viscous freely flowing slag that includes properties approximating glass. The slag formed from these minerals tends to mix with the sludge and facilitates removal of built-up sludge and maintenance of a combustion zone substantially free of sludge buildup. In the exemplary embodiment, a flyash material recovered from coal-fired power boilers is added to the fines recovered from gasifier 52 using fines handling system 206.

In the exemplary embodiment, fines handling system 206 includes a pneumatic conveying system 224 that includes an unloading tank 226, a baghouse 228, and a blower 230. A fines conveyance, such as a truck 232, barge (not shown), or railcar (not shown) transports the fines from a location other than gasifier 52, and couples to an offloading station 234. Blower 230 generates a vacuum in baghouse 228 such that air and flyash are transported from truck 232 to unloading tank 226. The air is discharged to ambient through baghouse 228 and the flyash is mixed with water in unloading tank 226 to form a slurry. The flyash is stored in a flyash storage tank 234 for use on demand by gasifier fines recycling system 202. When needed, flyash is pumped from flyash storage tank 234 to recycle tank 220. Fines pumped from trough 216 to recycle tank 220 are mixed with fines from flyash storage tank 234 in a proportion such that when the fines mixture from recycle tank 234 is pumped to injection system 208 and into gasifier 52, the combustion results in a slag that is flowable and glassy. Inorganic constituents, such as metals and minerals in the fuel and silicates in the flyash will form a glassy molten liquid in gasifier 52. The molten material accumulates in bottom shell 212 is periodically tapped through lockhopper 210 to trough 216 and recovered as a vitreous solid that is non-leachable and can be used as a construction aggregate.

Figure 3:
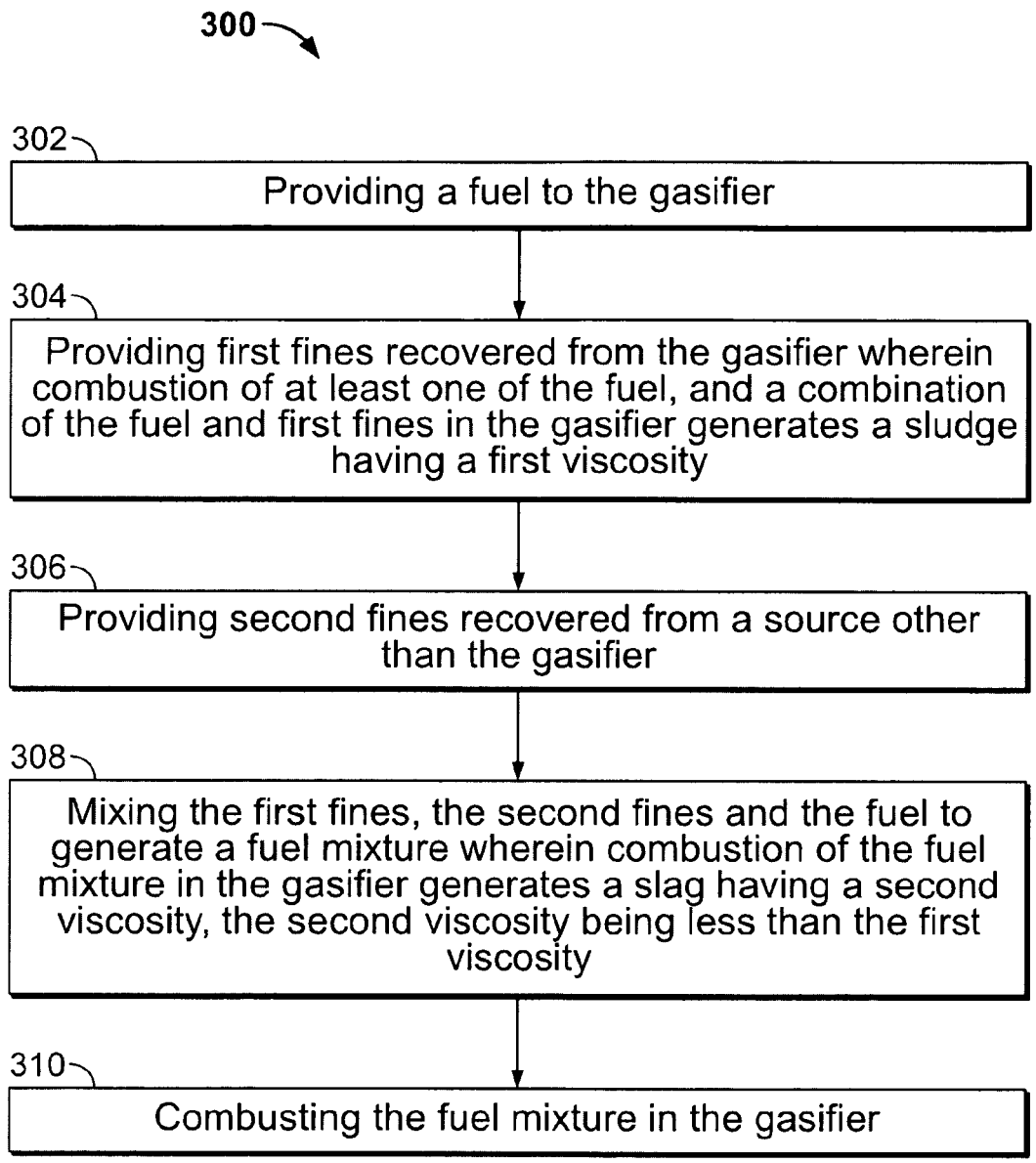
FIG. 3 is a flow chart of an exemplary method of combusting a fuel in a gasifier, such as the gasifier shown in FIG. 2.

FIG. 3 is a flow chart of an exemplary method 300 of combusting a fuel in a gasifier, such as gasifier 52 (shown in FIG. 2). The method includes providing 302 a fuel to gasifier 52. In the exemplary embodiment, a heavy residual oil is heated to a temperature greater than 400 degrees Fahrenheit and pumped into gasifier 52 through a nozzle adjacent to combustion zone 214 in gasifier 52. Heavy residual oil comprises contaminants and other constituents that typically lead to a sticky, non-flowable sludge to build up in combustion zone 214 and areas of gasifier 52 downstream of combustion zone 214. Such sludge tends to plug gasifier 52 wherein flow is reduced and back pressure increased such that gasifier 52 performance is adversely impacted. Method 300 includes providing 304 first fines recovered from gasifier 52 wherein combustion of at least one of the fuel, and a combination of the fuel and first fines in the gasifier generates a sludge having a first viscosity. The first viscosity is relatively high such that the sludge formed when combusting only fuel or a mixture of fuel and the first fines is sticky and does not flow sufficiently to be removed from combustion zone 214 fast enough to prevent plugging of gasifier 52. Method 300 includes providing 306 second fines recovered from a source other than the gasifier to be mixed 308 with the first fines and fuel to generate a fuel mixture wherein combustion of the fuel mixture in gasifier 52 generates a slag having a second viscosity, the second viscosity being less than the first viscosity. The slag formed from the combustion 310 of the first and second fines and the fuel tends to be glassy due to silicate constituents of the flyash. The glassy constituents and sticky constituents tend to form a flowable slag that is removed from gasifier 52 at a rate that facilitates reducing pluggage of gasifier during operation.

Exemplary embodiments of gasification systems and methods of recycling waste fines from a gasifier are described above in detail. The gasification system components illustrated are not limited to the specific embodiments described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A gasification system comprising:
   a pressure vessel comprising a combustion zone;
   a lockhopper coupled in flow communication with said pressure vessel for removing particulates discharged from said pressure vessel;
   a water-filled trough coupled in flow communication with said lockhopper and configured to separate first fines from slag, said water-filled trough comprising:

at least one conveyor; and a conveying pump configured to separate first fines from slag such that said at least one conveyor removes slag from said water-filled trough, and said conveying pump forces first fines suspended in said water-filled trough out of said water-filled trough;

a recycle tank coupled in flow communication with said water-filled trough and configured to:

receive the first fines channeled from said water-filled trough and second fines recovered from a location other than the pressure vessel; and mix the first fines with the second fines to form a fines combination; and a fuel injection system configured to inject a mixture of a fuel and the fines combination into the combustion zone, such that when the mixture is combusted, the fines combination facilitates reducing a viscosity of a sludge generated when the fuel is combusted without the fines.

2. A gasification system in accordance with claim 1 wherein said fuel comprises at least one of Nickel and Vanadium in a concentration such that the ash generated from combustion of the fuel comprises a fusion temperature greater than the operating temperature of the combustion zone.

3. A gasification system in accordance with claim 1 wherein said second fines comprise flyash.

4. A gasification system in accordance with claim 1 wherein combustion of said fuel in the combustion zone generates a sludge having a first viscosity and wherein combustion of said mixture in the combustion zone generates a slag having a second viscosity, the second viscosity being less than the first viscosity.

5. A gasification system in accordance with claim 1 wherein said recycle tank is further configured to receive a first slurry comprising the first fines and to receive a second slurry comprising the second fines.

6. A gasification system in accordance with claim 1 wherein said recycle tank is further configured to receive the first fines and to receive the second fines in relative proportion to generate a mixture having a predetermined viscosity slag when the mixture is combusted in the combustion zone.

* * * * *